Oct. 21, 1952 W. E. HEISE 2,614,510
APPARATUS FOR SEPARATING FROZEN ARTICLES FROM MOLDS
Filed Feb. 28, 1947 3 Sheets-Sheet 1

INVENTOR:
Walter E. Heise,
BY Bodell & Thompson
ATTORNEYS.

Oct. 21, 1952 — W. E. HEISE — 2,614,510
APPARATUS FOR SEPARATING FROZEN ARTICLES FROM MOLDS
Filed Feb. 28, 1947 — 3 Sheets-Sheet 2

INVENTOR:
Walter E. Heise,
BY Bodell & Thompson
ATTORNEYS.

Oct. 21, 1952     W. E. HEISE     2,614,510
APPARATUS FOR SEPARATING FROZEN ARTICLES FROM MOLDS
Filed Feb. 28, 1947     3 Sheets-Sheet 3

INVENTOR:
Walter E. Heise,
BY
Bodell & Thompson
ATTORNEYS.

Patented Oct. 21, 1952

2,614,510

UNITED STATES PATENT OFFICE 2,614,510

APPARATUS FOR SEPARATING FROZEN ARTICLES FROM MOLDS

Walter E. Heise, Syracuse, N. Y.

Application February 28, 1947, Serial No. 731,676

10 Claims. (Cl. 107—8)

1

This invention relates to apparatus for separating frozen articles from moulds. The apparatus is intended particularly for separating frozen confection articles from the moulds in which they are frozen. In the manufacture of such articles, the multi-compartment moulds are filled with eatable material, such as ice-cream, and a stick is inserted therein, the mould subjected to freezing temperature, whereby the confection freezes in the mould and onto the stick. The sticks are detachably secured to a carrier plate, or holder, which detachably engages the mould, whereby the sticks are centered in the respective pockets, or compartments, of the mould.

At the present time the mould, with the frozen articles therein, is moved manually into a heated zone and as the metallic moulds are heated, the articles are released therefrom. The holder is thereupon manually removed from the mould.

This invention has as an object an apparatus operable automatically to advance a procession of moulds in heat exchanging relation to a heating means, and when the articles have been released from the moulds, to move the holder with the frozen articles attached thereto out of engagement with the mould and to thereupon advance the empty moulds and the holders from the heating means.

The invention has as a further object an apparatus of the type referred to embodying a particularly simple and economical structure efficient in operation and capable of separating the frozen confection articles from the respective moulds without any manual manipulation.

The invention consists in the novel features and in the combinations and constructions hereinafter set forth and claimed.

In describing this invention, reference is had to the accompanying drawings in which like characters designate corresponding parts in all the views.

Figure 1:
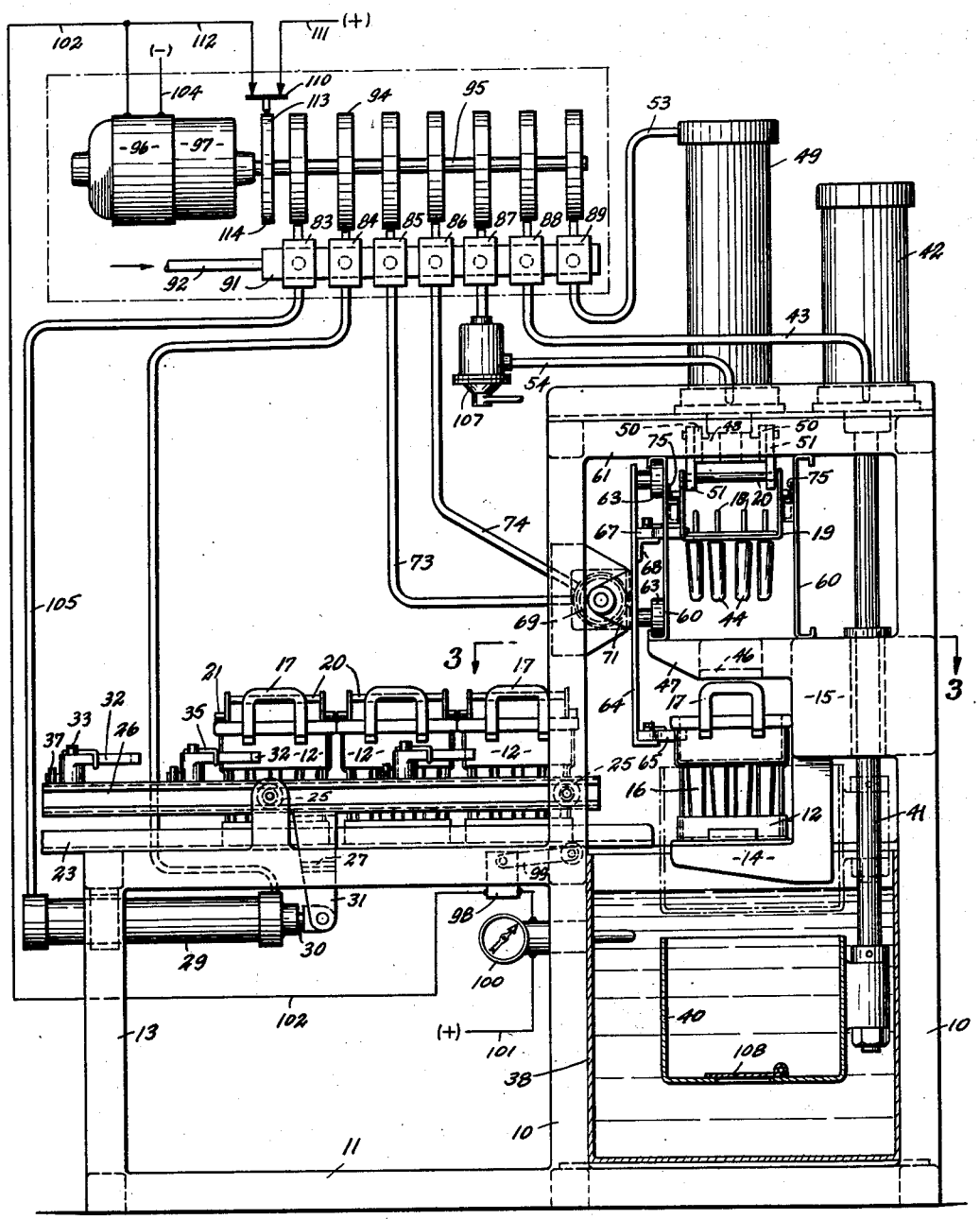
Figure 1 is a side elevational view of a device embodying my invention, the actuating mechanism therefor being shown diagrammatically.

The device consists of a suitable frame including vertically extending members 10 arranged respectively at the corners of the rectangular structure, and being mounted upon lower rails 11. The moulds 12 are advanced to the rectangular structure by means of a conveyor, the outer end of which is supported on posts 13. The moulds are advanced to a mould support 14 secured to the under side of a boxlike structure 15 secured between two of the uprights 10. The moulds 12 are of general rectangular structure formed with a plurality of article moulding pockets 16, and with a handle 17 extending upwardly from each end of the mould. Each article is frozen onto a stick which subsequently serves as a convenient handle for holding the confection article while it is being eaten. These sticks 18 are detachably clamped in a holder plate 19 positioned on the top of the mould and provided at each end with a handle 20. The holder is also provided with pins 21 extending laterally from each side of the plate and adjacent each end thereof. The moulds 12 are advanced toward the heating station, or mould support 14 by being intermittently slid along a support 23. This intermittent motion is effected by a reciprocating carriage mounted upon supporting rollers 25. The carriage consists of side members 26 U-shaped in cross section and connected by a plate 27, the ends of which are secured to the lower legs of the side members 26 and from which the ends of the plate depend to position the same below the mould supporting rails 23. The carriage is reciprocated by a fluid actuated cylinder 29 secured to the frame and having a piston rod 30 secured to a depending bracket 31 secured to the plate 27.

Figures 2, 3:
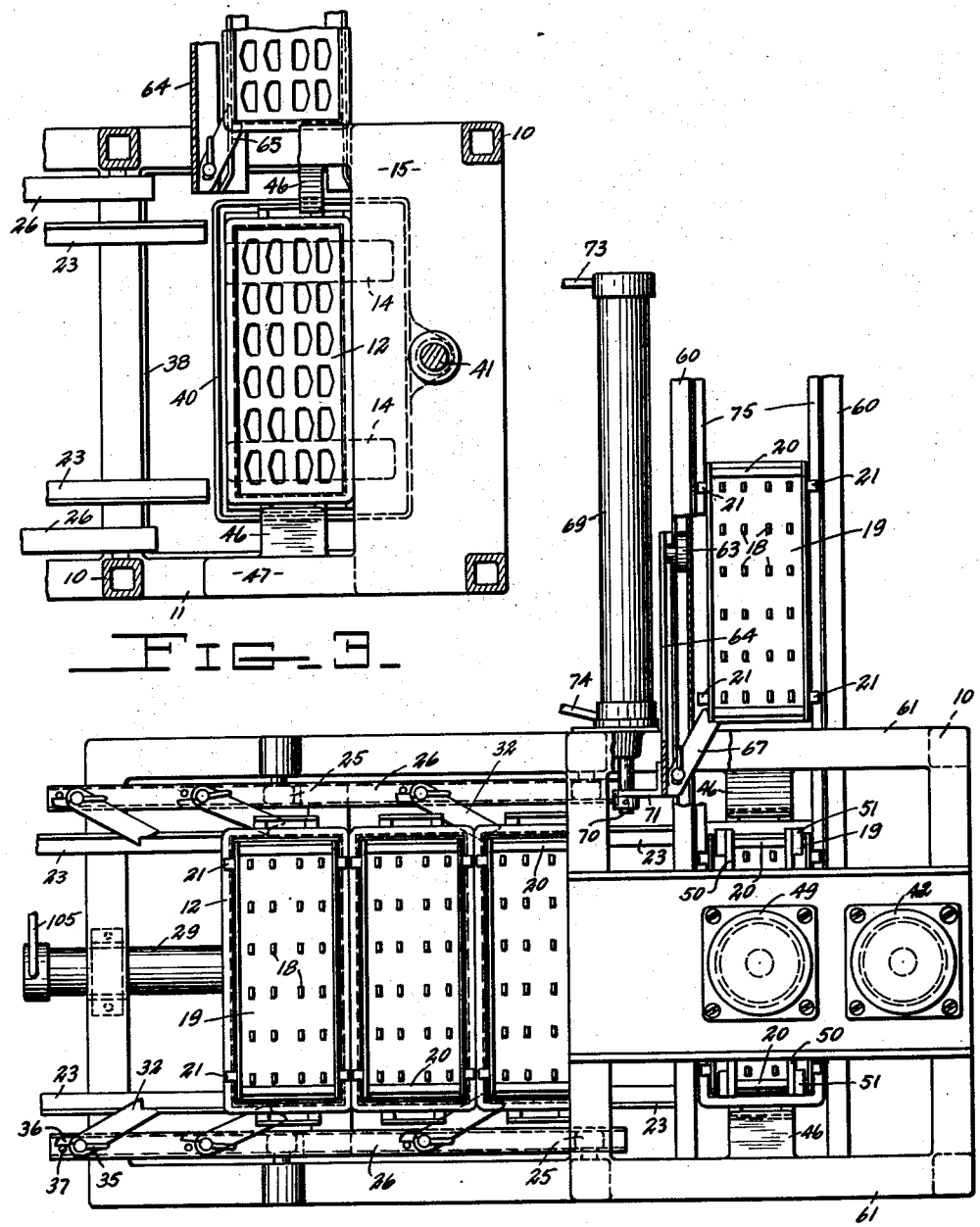
Figure 2 is a top plan view of the structure shown in Figure 1.
Figure 3 is a view taken on line 3—3, Figure 1.

A plurality of pusher members 32 are pivotally mounted, as at 33, to the top leg of the side members 26, the free ends of the pusher members 32 being yieldingly urged inwardly by torsion springs 35. The inward movement of the pusher members 32 is limited by a tail piece 36 engaging a stop pin 37 mounted upon the side members 26. The arrangement is such that when the carriage is moved rearwardly to the left Figure 1, the pusher members 32 ratchet over the moulds 12 and, upon forward movement of the carriage, the members engage the rear opposite corners of the moulds and cause them to advance forwardly, see Figure 2.

The mould support 14 is arranged above a tank 38 filled with a liquid maintained at high temperature. Means is provided for effecting relative vertical movement between the mould support 14 and the liquid in the tank 38. This is brought about by a bucket or container 40 mounted upon the lower end of a rod 41 extending through the box member 15, the upper end of the rod being secured to a piston slidably mounted in the fluid actuated cylinder 42 positioned on the top of the frame. When fluid is admitted to the lower end of the cylinder 42 through pipe 43, the bucket 40 is elevated to the dotted outline position indicated in Figure 1, at which time the pocket part of the mould 12 is immersed in the hot liquid. This constitutes a heater means for effecting release of the moulded articles 44.

As the moulds, with the articles therein and the article holder plates thereon, are moved onto the mould support 14, the moulds are restrained from upward movement by plates 46 secured to and extending inwardly from brackets 47 projecting laterally from the box structure 15.

Means is provided for effecting a force on the holder plates 19 tending to separate the same from the mould upon release of the moulded articles 44 from the mould compartments 16. This means comprises a member 48 secured to the lower end of a piston rod depending from the fluid actuated cylinder 49 also mounted upon the top of the frame structure. A plate 50 is secured to each side of the member 48, and a pair of latch members 51 are pivoted to each of the plates 50 and depend downwardly therefrom. The latch members 51 normally rest against stop pins 52, and the lower ends of the latches are formed with cam surfaces 53, the arrangement being such that when the member 48 is lowered, the latches move into engagement with the handles 20 on the holder plates 19. The member 48, and the latches carried thereby, is moved downwardly by the admission of air to the cylinder 49 through pipe 53, and the assembly is moved upwardly by the admission of fluid through the pipe 54, and when air is thus applied to the bottom of the cylinder 49, the assembly will move upwardly and carry with it the holder plate 19 with the frozen articles 44 depending therefrom to the position shown in Figure 1 when the mould has been sufficiently defrosted to release the frozen articles. After the articles have been separated, or removed from the moulds, the moulds are advanced from the support 14, and the plates carrying the moulded articles are also advanced forwardly.

A pair of spaced apart plates 60 are mounted between the brackets 47 and a top cross member 61 of the frame. The edges of one of the plates 60 are bent to provide tracks to receive rollers 63 mountd on a plate 64, the lower end of which terminates in juxtaposition to the top of the mould 12 positioned on the support 14. This lower edge of the plate 64 is bent inwardly and a pusher member 65, similar to the pusher members 32, is mounted thereon and when the plate 64 is in forward position, the member 65 engages a rear corner of the mould. A similar pusher member 67 is mounted on an angle bracket 68 secured to the plate 64, and is positioned to engage a corner of the holder plate 19. The plate 64 is reciprocated by means of cylinder 69, the piston rod 70 of which is secured to the plate by bracket 71, see Figure 2.

Figure 4:
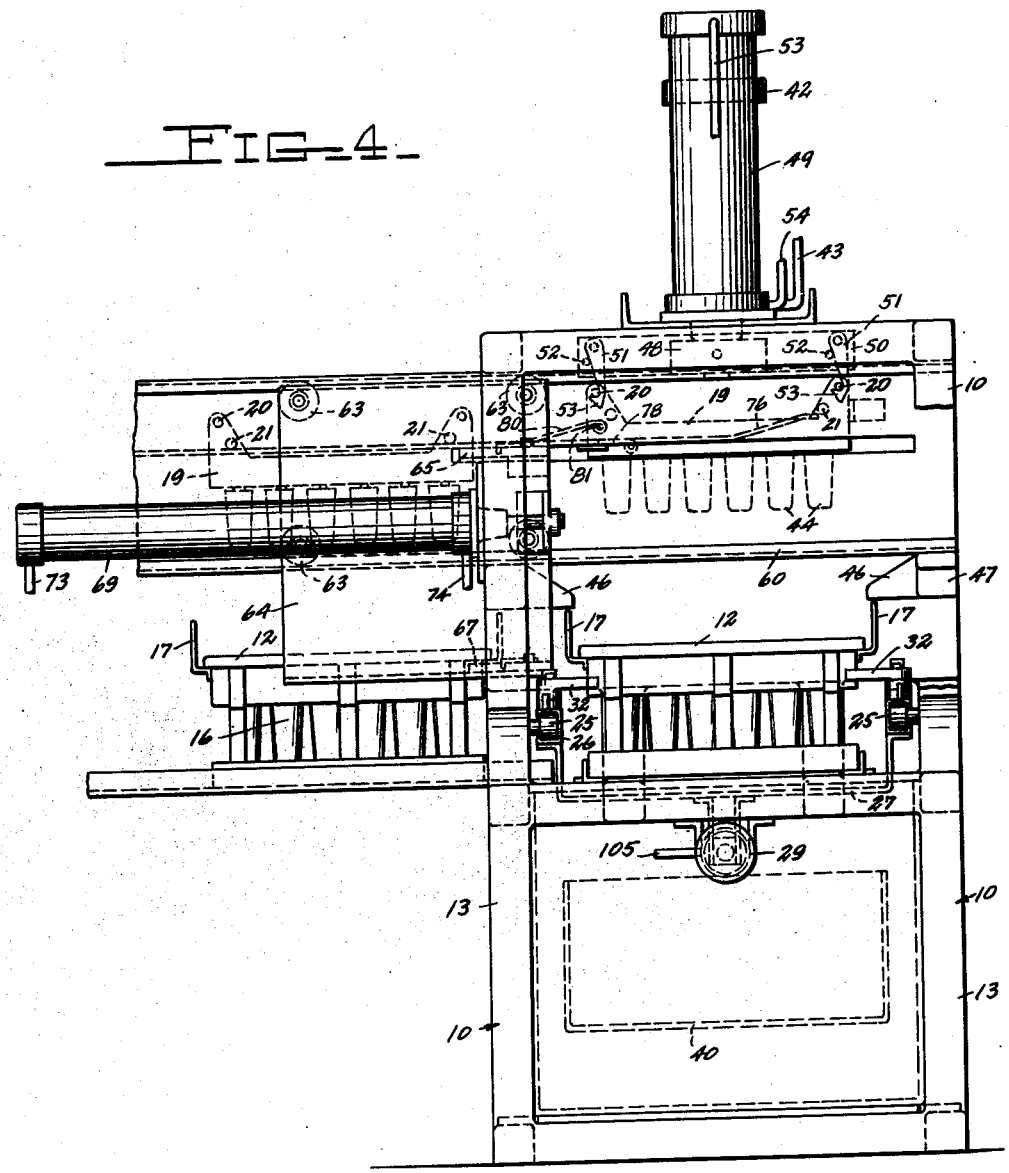
Figure 4 is an end elevational view, looking to the right, in Figure 1.

When fluid is admitted to the cylinder 69 through pipe 73, the plate 64 is caused to move forwardly to the right, Figure 4, and when fluid is admitted to the opposite end of the cylinder through pipe 74, the assembly is moved rearwardly simultaneously moving the mould 12 from the support 14 and moving the holder 19 onto the conveyor rails 75 which extend forwardly adjacent the inner sides of the plates 60. The forward end of the rails are inclined upwardly, as at 76, Figure 4, and terminate so that the pins 21 on the forward end of the holder 19 clear during upward movement of the holder. The rails 75 are provided with hinged sections 78 arranged to permit the pins 20 on the opposite end of the holder to pass up through the rails 75 to the position indicated in Figure 1 and in dotted outline, Figure 4. As the holder 19 is moved rearwardly by the member 67, it is moved out of engagement with the latches 51 and the pins 21 engage the incline 76 and the pins at the opposite end of the holder engage inclines 80 which are pivoted to the plates 60, as at 81. The holder thus descends to the level of the rails 75, the forward end 20 passing over the hinge section 78, Figure 4, and under the lower end of the inclined member 80. The carriers are propelled along the ways by any suitable conveying means.

Fluid is admitted to the cylinders 29, 42, 49 and 69 by a series of valves 83—89 mounted upon a header 91 connected to a source of fluid under pressure through pipe 92. The valves are of the type wherein the pipes leading from the cylinders are normally connected to atmosphere, and the valves are operated by cams 94 mounted upon a shaft 95 driven by a motor 96 through a gear reduction 97, the valves being actuated by the cams 94 to connect the pipes leading to the cylinders respectively to the fluid source 92. The circuit for the motor includes a switch 98 which is closed by the moulds 12, actuating an arm 99 as they move along the rails 23. Preferably, the motor circuit further includes a theremostat switch 100, the contacts of which are closed while the liquid in the tank 38 is maintained at a predetermined temperature. With this arrangement, a hot feed is furnished from wire 101, switches 100, 98, wire 102, to the motor 96 and thence, to the return side of the circuit through wire 104. Rotation of the shaft 95 closes the valve 83 by its associated cam applying air to the rear end of the cylinder 29 through pipe 105. This effects movement of the pusher members 32 and advances the foremost mould to the mould support 14. The valves 88, 89 are actuated, the valve 88 supplying fluid to the lower end of the cylinder 42 through pipe 43, effecting upward movement of the bucket 40 to the dotted outline position, Figure 1, the valve 89 applying air to the top of the cylinder 49 through pipe 53 to lower the latches 51 into engagement with the handles 20 on the article holder and thereupon, the valve 89 is closed connecting the pipe 53 with atmosphere and the valve 87 is opened to apply fluid through pipe 54 to the lower end of the cylinder 49. Preferably, a regulating valve 107 is connected in this line, whereby the pressure created by the piston in cylinder 49, tending to separate the holder from the mould, may be regulated so that the articles 44 will not be pulled from the mould before the mould has been properly defrosted, or the articles properly released from the pockets in the mould.

The valve assembly now remains inactive by the formation of the cams for a sufficient period of time to permit the hot liquid surrounding the mould to effectively defrost, or release, the articles from the mould, whereupon the holder 19 is elevated for transfer to the rails 75. Thereupon, the valve 88 is closed and the pipe 43 connected to atmosphere to permit the bucket 40 to descend. During this descent, a flat valve 108, in the bottom of the bucket, opens permitting a fresh supply of hot liquid to enter the bucket preparatory to its next ascent. The valve 85 is then opened to supply fluid to the rear end of the cylinder 69 through pipe 73 to effect movement of the carriage and pusher member 67 carried thereby forwardly and, at the end of this forward stroke, the valve 85 is closed and the valve 86 opened applying fluid to the forward end of the cylinder 69 through pipe 74 and thus effecting transfer of the holder 19 and the empty mould rearwardly.

If there are a series or progression of moulds 12 being advanced into the apparatus on rails 23, the switch arm 99 will remain depressed, whereby the motor continues to operate the cam shaft 95 in repeated cycles. In the event however the moulds approach on the rails 23 in spaced relation, which would result in the switch arm 99 moving upwardly as soon as a mould was transferred from the rails 23 to the support 14, the motor 96, nevertheless, continues to operate the cam shaft 95 through its cycle of operation. This is brought about by a cam actuated switch 110, the contacts of which are connected to the hot side of the line through wire 111, and to the motor feed 102, through wire 112. The switch 110 is actuated by a cam 113 which is provided with a depression 114 arranged to permit the switch 110 to open at the completion of the cycle of the apparatus.

It will be apparent, the structure described constitutes an apparatus for automatically separating the frozen articles from the mould and which operates sufficiently to achieve this result. The application of a hot liquid to the mould constitutes an effective means of heating the mould particularly in view of the fact of the depending pocket arrangement 13 and the bucket arrangement functions to agitate the liquid in the tank 38 each time it descends and ascends, thereby maintaining an even temperature throughout the body of the liquid.

What I claim is:

1. Apparatus for separating frozen articles from moulds containing a plurality of such articles attached to a holder plate comprising a separating station, a mould advancing means operable to successively advance filled moulds to said station and empty moulds therefrom, a mould heating means arranged at said station and operable to heat said moulds sufficiently to weaken the surface adhesion between the frozen articles and the moulds, a holder plate moving means arranged at said station and being movable into engagement with said plates and being operable during application of heat to said moulds to exert a force incapable of separating the frozen articles from the moulds and capable of moving said holder plates upwardly to effect separation of the articles and the moulds when said surface adhesion is weakened, a holder plate advancing means operable to advance the separated plates with the articles attached thereto from said station, and motion transmitting mechanism operable to actuate said advancing means and plate moving means in timed relation.

2. Apparatus for separating frozen articles from moulds containing a plurality of such articles attached to a holder plate comprising a separating station, a mould advancing means operable to successively advance filled moulds to said station and empty moulds therefrom, a mould heating means arranged at said station and operable to heat said moulds sufficiently to weaken the surface adhesion between the frozen articles and the moulds, a holder plate moving means arranged at said station and being movable into engagement with said plates and being operable during the application of heat to said moulds to exert a pressure incapable of separating the frozen articles from the moulds and capable of moving said holder plates upwardly to effect separation of the articles from the moulds when said surface adhesion is weakened, means operable to vary said pressure, a holder plate advancing means operable to advance the separated plates with the articles attached thereto from said station, and motion transmitting mechanism operable to actuate said advancing means and said plate moving means in timed relation.

3. Apparatus for separating frozen articles from moulds comprising a separating station, a mould heating means arranged at said station and operable to heat moulds sufficiently to effect release of said articles, a mould advancing means operable to successively advance moulds each containing a plurality of frozen articles attached to a holder plate to said station, a plate moving means operable during the application of heat to said moulds at said station to move said plates and upon release of said articles to effect separation thereof from the moulds, a second mould advancing means operable to advance the empty moulds from said station, a holder plate advancing means operable to advance the separated plates with the articles attached thereto from said station, and motion transmitting mechanism operable to actuate said advancing means and said plate moving means in timed relation.

4. Apparatus for separating frozen articles from moulds, each containing a plurality of such articles attached to a holder plate comprising a mould heating station, mould heating means arranged at said station for heating the moulds sufficiently to weaken the surface adhesion between the articles and the moulds, mould advancing means operable to successively advance filled moulds to said station and empty moulds therefrom, means restraining the moulds positioned at said station from vertical movement, a holder plate moving means arranged at said station above moulds positioned thereat and being movable downwardly into engagement with said holder plates and operable during application of heat to the moulds to exert an upward pressure incapable of separating the frozen articles from the moulds and capable of moving said holder plates upwardly to effect separation thereof from the moulds when said surface adhesion is weakened, a second mould advancing means operable to advance empty moulds from said station, a holder plate advancing means operable to advance the separated holders from said station, and motion transmitting means operable to actuate said mould advancing means, plate advancing means, and plate moving means, in timed relation.

5. Apparatus for separating frozen articles from moulds, each containing a plurality of such articles attached to a holder plate comprising a separating station, a mould advancing means operable to successively advance filled moulds to said station, a mould heating means arranged at said station and operable to heat moulds positioned thereat sufficiently to weaken the surface adhesion between the frozen articles and the moulds, a holder plate moving member mounted at said station for vertical movement toward and from said moulds, actuating mechanism operable to move said member downwardly into engagement with said plates and to exert an upward force thereon incapable of separating the frozen articles from the mould and capable of moving said plates with the articles attached thereto to an upper level when said surface adhesion is weakened, a second mould advancing means operable to advance empty moulds forwardly from said station, and a holder plate advancing means operable to advance the separated plates forwardly along a level above said empty moulds.

6. Apparatus for separating frozen articles from moulds containing a plurality of such articles attached to a holder plate comprising a separating station, a mould advancing means operable to successively advance filled moulds to said station and empty moulds therefrom, a tank containing a heated liquid arranged at said station, a container open at the top, motion transmitting means operable to effect downward movement of the container to submerge the same in the liquid in said tank, and to move said container upwardly about a mould positioned at said station and cause said container to dwell in the upper position for a period sufficient to heat said moulds to weaken the surface adhesion between the frozen articles and the moulds, a holder plate moving means arranged at said station and being movable into engagement with said plates and being operable during the application of the heated liquid to the moulds to exert a force tending to move said holder plates upwardly from the moulds and only upon weakening of the surface adhesion between the articles and the moulds to effect separation of the articles and the moulds, a holder plate advancing means operable to advance the separated plates with the articles attached thereto from said station, and motion transmitting mechanism operable to actuate said container, advancing means and plate moving means in timed relation.

7. Apparatus for separating frozen articles from moulds containing a plurality of such articles atached to a holder plate comprising a separating station, a mould advancing means operable to successively advance filled moulds to said station and empty moulds therefrom, a tank containing a heated liquid arranged at said station, a container open at the top, motion transmitting means operable to effect downward movement of the container to submerge the same in the liquid in said tank, and to move said container upwardly about a mould positioned at said station and cause said container to dwell in the upper position for a period sufficient to heat said moulds to weaken the surface adhesion between the frozen articles and the moulds, a valve mechanism arranged in the bottom of said container and being operable to admit hot liquid in the container upon downward movement of the same into the tank, a holder plate moving means arranged at said station and being movable into engagement with said plates and being operable during the application of the heated liquid to the moulds to exert a force tending to move said holder plates upwardly from the moulds and only upon weakening of the surface adhesion between the articles and the moulds to effect separation of the articles and the moulds, a holder plate advancing means operable to advance the separated plates with the articles attached thereto from said station, and motion transmitting mechanism operable to actuate said container, advancing means and plate moving means in timed relation.

8. Apparatus for separating frozen articles from moulds containing a plurality of such articles attached to a holder plate comprising a suitable frame, a separating station, a mould guideway extending to said station, a mould discharge guideway extending from said station, a holder plate guideway extending from said station in vertically spaced parallel relation to said mould discharge guideway, mould advancing members operable to successively advance moulds along said first guideway to said station, means arranged at said station to heat said moulds to weaken the surface adhesion between the frozen articles and the moulds, holder plate moving means cooperable during the application of heat to said moulds to move the holder plates upwardly and to effect such upward movement only upon weakening of the surface adhesion between the articles and the mould and to position the separated holder plate in register with said holder plate guideway, a second mould advancing means operable to advance the empty moulds along said mould discharge guideway, holder plate advancing means operable to advance the separated holder plates along the holder plate guideway, and motion transmitting mechanism operable to actuate said structures in timed relation.

9. Apparatus for separating frozen articles moulds containing a plurality of such articles attached to a holder plate comprising a separating station, a mould advancing means operable to successively advance filled moulds to said station and empty moulds therefrom, a mould heating means arranged at said station and operable to heat moulds sufficiently to weaken the surface adhesion between the frozen articles and the moulds, a holder plate moving means arranged at said station and being movable into engagement with said plates and being operable during the application of heat to said moulds to exert a force incapable of separating the frozen articles from the moulds but capable of moving said holder plate upwardly to effect separation of the articles and the moulds when said surface adhesion is weakened, a holder plate advancing means operable to advance the separated plates with the articles attached thereto from said station, motion transmitting mechanism operable to actuate said advancing means and plate moving means in timed relation, and means operable to render said motion transmitting means inoperable until said heating means reaches a predetermined temperature.

10. Apparatus for separating frozen articles from moulds containing a plurality of such articles attached to a holder plate comprising a frame, a tank containing a heated liquid, a mould support for supporting a mould, means operable to effect relative vertical movement between the mould support and tank to effect immersion of the mould in the heated liquid, a cylinder and piston structure mounted on the frame and being operatively connected to the holder plate, means operable to supply fluid under pressure to said cylinder and piston structure during the immersion of the mould in the heated liquid, and said cylinder and piston structure being operable upon the application of such fluid pressure to move the holder plate upwardly from the mould when the surface adhesion between the frozen articles and the moulds is weakened.

WALTER E. HEISE.

REFERENCES CITED

The following references are of record in the file of this patent:

UNITED STATES PATENTS

| Number | Name | Date |
|---|---|---|
| 1,960,456 | Robb | May 29, 1934 |
| 2,100,031 | Hall | Nov. 23, 1937 |
| 2,166,381 | Taylor et al. | July 18, 1939 |
| 2,172,182 | Thomas | Sept. 5, 1939 |